(12) United States Patent
Han et al.

(10) Patent No.: US 11,135,572 B2
(45) Date of Patent: Oct. 5, 2021

(54) THREE-WAY CATALYST COMPRISING PD—RH ALLOY

(71) Applicant: HEESUNG CATALYSTS CORPORATION, Gyeonggi-do (KR)

(72) Inventors: Hyun-sik Han, Seoul (KR); Seung Chul Na, Gyeonggi-do (KR); Jin-Woo Song, Incheon (KR); Narayana Rao Komateedi, Gyeonggi-do (KR); Kwi-Yeon Lee, Gyeonggi-do (KR)

(73) Assignee: HEESUNG CATALYSTS CORPORATION, Gyeonggi-Do (KR)

( * ) Notice: Subject to any disclaimer, the term of this patent is extended or adjusted under 35 U.S.C. 154(b) by 35 days.

(21) Appl. No.: 15/780,741

(22) PCT Filed: Dec. 1, 2016

(86) PCT No.: PCT/KR2016/014024
§ 371 (c)(1),
(2) Date: Jun. 1, 2018

(87) PCT Pub. No.: WO2017/095158
PCT Pub. Date: Jun. 8, 2017

(65) Prior Publication Data
US 2018/0361361 A1    Dec. 20, 2018

(30) Foreign Application Priority Data
Dec. 2, 2015    (KR) .................. 10-2015-0170368

(51) Int. Cl.
| | | |
|---|---|---|
| B01J 23/46 | (2006.01) | |
| B01J 37/08 | (2006.01) | |
| B01J 23/44 | (2006.01) | |
| B01J 37/00 | (2006.01) | |
| B01J 37/02 | (2006.01) | |
| B01J 37/04 | (2006.01) | |
| B01J 37/16 | (2006.01) | |
| B01J 21/04 | (2006.01) | |
| B01J 23/10 | (2006.01) | |
| F01N 3/10 | (2006.01) | |

(52) U.S. Cl.
CPC ............ *B01J 23/464* (2013.01); *B01J 21/04* (2013.01); *B01J 23/10* (2013.01); *B01J 23/44* (2013.01); *B01J 23/46* (2013.01); *B01J 37/00* (2013.01); *B01J 37/0036* (2013.01); *B01J 37/02* (2013.01); *B01J 37/0209* (2013.01); *B01J 37/0234* (2013.01); *B01J 37/04* (2013.01); *B01J 37/08* (2013.01); *B01J 37/16* (2013.01); *F01N 3/101* (2013.01); *B01J 2523/3712* (2013.01); *B01J 2523/48* (2013.01); *B01J 2523/822* (2013.01); *B01J 2523/824* (2013.01)

(58) Field of Classification Search
CPC . B01J 23/464; B01J 21/04; B01J 23/10; B01J 23/44; B01J 23/46; B01J 37/00; B01J 37/0036; B01J 37/02; B01J 37/0209; B01J 37/0234; B01J 37/04; B01J 37/08; B01J 37/16; F01N 3/101
See application file for complete search history.

(56) References Cited

U.S. PATENT DOCUMENTS

| | | | |
|---|---|---|---|
| 4,018,706 A | * | 4/1977 | Inoue .................. B01D 53/8637 502/248 |
| 7,576,029 B2 | | 8/2009 | Saito et al. |
| 9,440,223 B2 | | 9/2016 | Aoki |
| 2006/0217263 A1 | | 9/2006 | Kawamoto et al. |
| 2012/0107405 A1 | * | 5/2012 | Fernandezlozano ... B82Y 30/00 424/490 |
| 2015/0321185 A1 | * | 11/2015 | Ueno .................... B01J 29/7615 502/66 |
| 2015/0367328 A1 | * | 12/2015 | Ikeda ........................ B01J 23/63 423/213.5 |
| 2018/0280878 A1 | * | 10/2018 | Inoda ..................... B01J 23/464 |

FOREIGN PATENT DOCUMENTS

| | | |
|---|---|---|
| JP | 4199691 B2 | 12/2008 |
| JP | 4999331 B2 | 8/2012 |
| JP | 5807782 B2 | 11/2015 |
| KR | 20150170368 | 12/2015 |
| WO | WO-2014119749 A1 * 8/2014 .............. B01J 23/63 |
| WO | PCT/KR2016/014024 | 12/2016 |

OTHER PUBLICATIONS

Maillet et al (Effects of Pretreatments on the Surface Composition of Alumina-Supported Pd—Rh Catalysts, J Cata, 202, (2001) pp. 367-378). (Year: 2001).*
Vedyagin, A.A. et al., Catalytic Purification of Exhaust Gases Over Pd—Rh Alloy Catalysts. Top Catal. 2013; 56:1008-14.
Wang, S.-B. et al., Pd—Rh Nanocrystals with Tunable Morphologies and Compositions as Efficient Catalysts Toward Suzuki Cross-Coupling Reactions. ACS Catal. 2014; 4(7):2298-306.
International Search Report dated Feb. 15, 2017 by the International Searching Authority for Patent Application No. PCT/KR2016/014024, which was filed on Dec. 1, 2016 and published as WO 2017/095158 dated Jun. 8, 2017 (Inventor—Han et al.; Applicant—Heesung Catalysts Corp.) (Original—3 pages; Translation—2 pages).

* cited by examiner

*Primary Examiner* — Sheng H Davis
*Assistant Examiner* — Michael Forrest
(74) *Attorney, Agent, or Firm* — Ballard Spahr LLP

(57) ABSTRACT

The present invention relates to a method for preparing a supported catalyst comprising a crystalline Pd—Rh alloy, the method comprising the steps of: (i) producing an impregnated support by means of mixing an inorganic support, a Pd precursor solution and an Rh precursor solution; and (ii) thermally treating the impregnated support in a reducing gas atmosphere.

5 Claims, 3 Drawing Sheets

[FIG. 1]
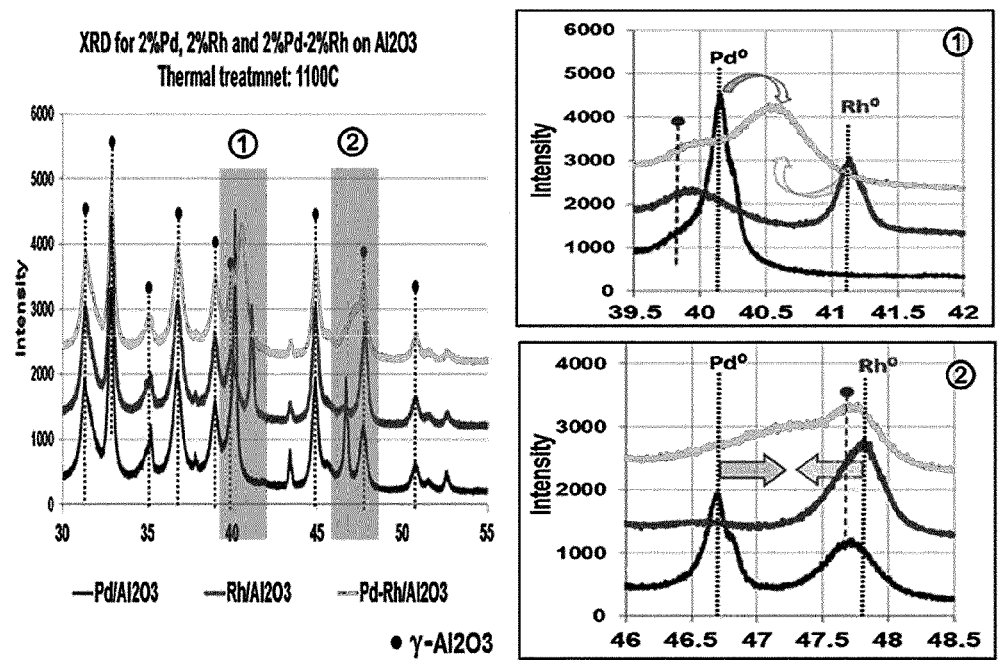

[FIG. 2]
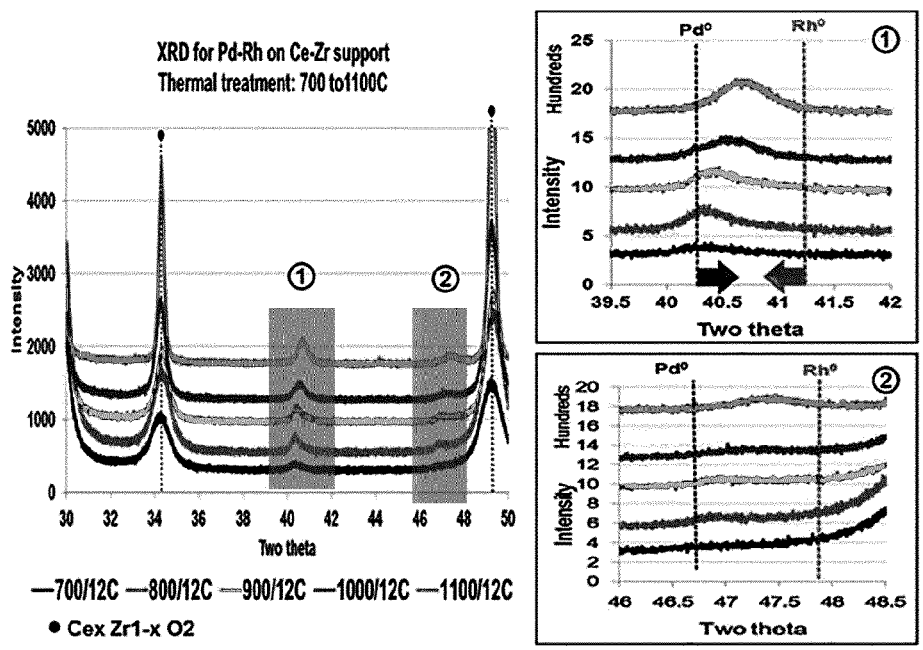
[FIG. 3]
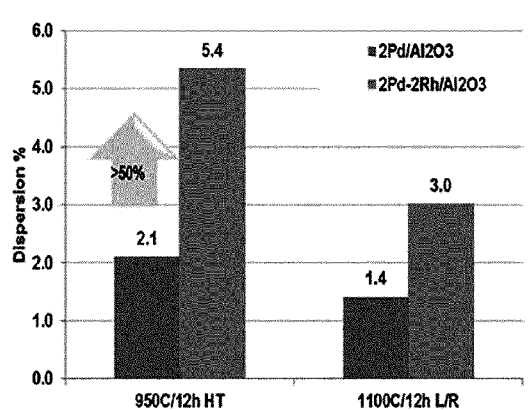
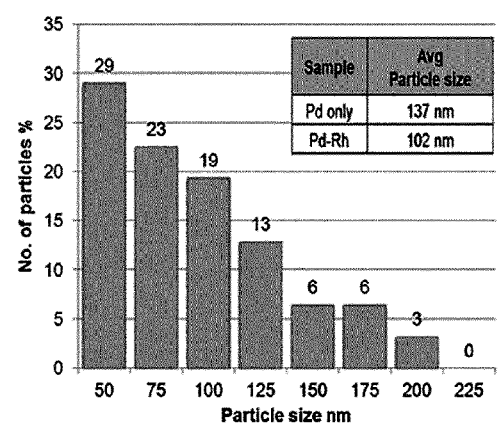

[FIG. 4]
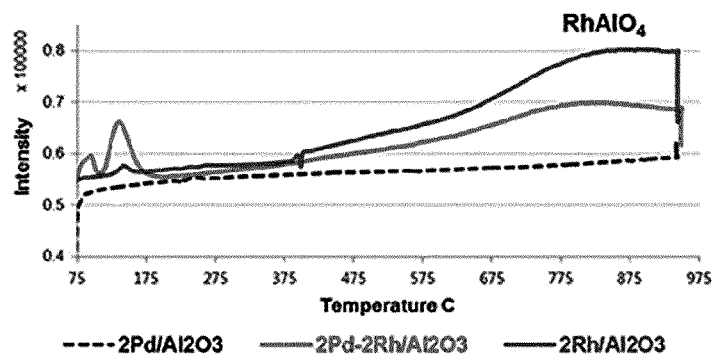
[FIG. 5]
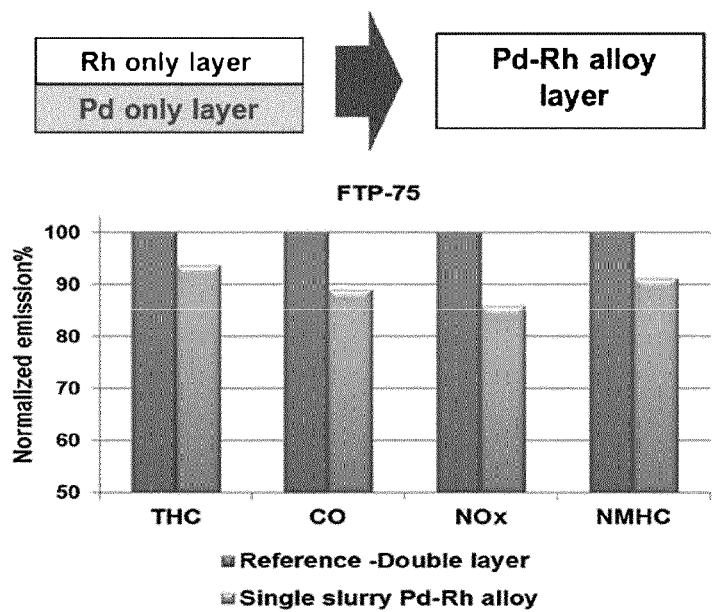

THREE-WAY CATALYST COMPRISING PD—RH ALLOY

CROSS-REFERENCE TO RELATED APPLICATIONS

This application is a U.S. National Phase Application of International Application No. PCT/KR2016/014024, filed Dec. 1, 2016, which claims priority to Korean Application No. 10-2015-0170368, filed Dec. 2, 2015, each of which are hereby incorporated by reference in their entirety.

TECHNICAL FIELD

The present invention relates to a three-way catalyst including a Pd—Rh alloy and, more particularly, to a three-way catalyst including a crystalline Pd—Rh alloy, and an one-pot method of manufacturing the same.

BACKGROUND ART

A three-way catalyst serves to decrease harmful components of CO and HC via an oxidation reaction and NOx via a reduction reaction, among exhaust gases from vehicles. A catalyst main body includes a substrate made of ceramics and an $Al_2O_3$ wash coat applied on the substrate, and the wash coat includes noble metal components carried in alumina. In the three-way catalyst, a three-way noble metal system of Pt/Pd/Rh including Pt, Rh, and palladium (Pd) is used as the noble metal component. Pt mainly promotes an oxidation reaction that lowers CO and HC, and Rh promotes an NO reaction. It is known that Pd is advantageous for CO and HC light-offs (reaction initiation temperature) but is disadvantageous for a NOx reaction and sulfur poisoning (performance degradation due to a sulfur component contained in fuel). In order to optimize the performance of the three-way catalyst in practice, Pd and Rh components are present as separate noble metal components. That is, the Pd and Rh components are disposed in the form of separate components in the three-way catalyst, so that the Pd and Rh components do not form an alloy. For example, Pd and Rh are present in the form of double layers so as to avoid alloying therebetween, or are present on separate supports even when they are present in the form of single layer. The reason why the Pd and Rh components are constituted as separate components in the catalyst is that Pd—Rh alloying is judged to negatively affect the components of the three-way catalyst.

DISCLOSURE

Technical Problem

Surprisingly, however, the present inventors have found that the performance of a three-way catalyst is greatly improved using Pd—Rh alloying, unlike the above-described conventional judgment and belief.

Technical Solution

The present invention relates to a method of manufacturing a supported catalyst including a crystalline Pd—Rh alloy, the method including (i) generating an impregnated support by mixing an inorganic support, a Pd precursor solution, and an Rh precursor solution, and (ii) thermally treating the impregnated support in a reducing gas atmosphere. Examples of the inorganic support include an alumina support and a ceria-zirconia mixed oxide, but are not limited thereto. Further, a representative example of the reducing gas atmosphere may be an exhaust gas atmosphere.

Further, the present invention relates to a method of manufacturing a catalyst main body including a supported catalyst including a crystalline Pd—Rh alloy, the method including (i) generating an impregnated support by mixing an inorganic support, a Pd precursor solution, and an Rh precursor solution, (ii) manufacturing a slurry wash coat by mixing the impregnated support and an additive, (iii) coating the substrate with the slurry wash coat, and (iv) thermally treating the coated substrate in the presence of a reducing gas. The additive includes a solvent and/or an oxygen storage material. The weight ratio of Pd and Rh on the inorganic support may be 2001:1 to 1:200, but is not limited thereto. The catalyst main body manufactured using the above-described method is applied to a three-way catalyst for purifying exhaust gas of a vehicle.

Further, the present invention relates to a method of manufacturing a catalyst main body including a supported catalyst including a crystalline Pd—Rh alloy, the method including (i) generating an impregnated support by mixing an inorganic support, a Pd precursor solution, and an Rh precursor solution, (ii) thermally treating the impregnated support in a reducing gas atmosphere, (iii) manufacturing a slurry wash coat by mixing the thermally treated support and an additive, and (iv) coating a substrate with the slurry wash coat.

DESCRIPTION OF DRAWINGS

FIG. 1 is an XRD graph showing a Pd—Rh alloy crystal formation process during a thermal treatment step (1100° C.);

FIG. 2 is an XRD graph showing a crystal formation process during a thermal treatment step (700 to 1100° C.);

FIG. 3 shows the alloy dispersion at 950° C. and 1100° C. according to a CO chemisorption experiment and the particle distribution according to TEM-EDAX;

FIG. 4 shows an effect of inhibiting the formation of $RhAlO_4$ due to the formation of a palladium-rhodium alloy; and FIG. 5 is a view comparing the THC, CO, and NOx lowering performances of catalysts.

BEST MODE

Definition

The term 'catalyst' used in the present application means a powder form in which active components, for example, Pd and Rh, are carried in a support, for example, an alumina powder. A 'catalyst main body' means a structure in which the 'catalyst' is applied on a substrate, for example, cordierite. A 'wash coat' means a slurry in which the catalyst and other components are mixed. The wash coat is applied on the substrate to thus form the catalyst main body. However, as will be appreciated by those skilled in the art, the terms 'catalyst or catalyst main body' may be used interchangeably. A 'thermal treatment step' means a heating step for inducing raw material components in a precursor state to form a stable structure, in particular, a heating step in an exhaust gas atmosphere. The 'exhaust gas atmosphere' includes exhaust gas components, for example, $O_2$, CO2, CO, $H_2$, HC (AHC (aromatic hydrocarbons), propane/propene, and the like), NOx, and $H_2O$, emitted from a gasoline engine. In the art, the exhaust gas atmosphere means an atmosphere that contains 5 to 10 wt % of $H_2O$, and $O_2$, $CO_2$, CO, $H_2$, HC (AHC (aromatic hydrocarbons), propane/propene, and the like), NOx, and $N_2$ components in an amount ranging from 0 to 15 wt %. In the present application, a 'preliminary catalyst' means a catalyst in a state where the alloying does not proceed before the thermal treatment step is applied in view of structure, and specifically means a catalyst in the state in which precursors are simply carried in a support. The dictionary meaning of 'one pot' means a synthetic operation where, when a target compound is synthesized using a reaction process of two stages or more, the product of each step (intermediate product) is not isolated and not purified, but the reactant of the next step is applied in a single reaction vessel to continuously perform the reaction so that the target compound is obtained. The 'one pot' reaction of the present application means a reaction where catalyst precursor components are simply mixed to manufacture the preliminary catalyst. Therefore, the preliminary catalyst is formed using the one-pot manufacturing, and a catalyst and a catalyst main body in which the palladium-rhodium alloying is realized may be manufactured via thermal treatment using the preliminary catalyst. However, as described above, the catalyst main body may be provided without using the preliminary catalyst. Particularly, a crystalline Pd—Rh alloy support, which may also be called a thermally treated support, may be manufactured in advance, and the crystalline Pd—Rh alloy support may be mixed with a solvent and/or an oxygen storage material to thus manufacture a slurry wash coat. Subsequently, the substrate may be coated with the slurry wash coat, thereby manufacturing the catalyst main body.

A configuration practically acceptable in the art with respect to the arrangement of the precious metal components of the three-way catalyst is that palladium and rhodium must be present as separate components. That is, the catalysts were configured so that the palladium and rhodium were not approaching or adjacent to each other. For example, while palladium was carried in a support and then thermally fixed, rhodium was carried in another support and then thermally fixed. Thereafter, the resultant supports were shaped into wash coats to apply on cordierite, thus manufacturing a three-way catalyst main body. The main body is mounted in vehicle exhaust systems via a canning operation.

However, unlike the conventional concept, the present inventors unexpectedly found that the alloying of palladium and rhodium does not lower the performance of the three-way catalyst but improves the performance thereof. The present inventors found that palladium and rhodium are subjected to a thermal treatment process to thus form alloys and that the alloys include crystalline particles, and also found that the crystalline particles include particles which are finer than and have dispersion superior to particles including only palladium. It was also found that Pd—Rh alloying inhibits the generation of $RhAlO_4$ components known to negatively affect the three-way catalyst performance. The present inventors found that, unlike the conventional concept, the alloying of palladium and rhodium can greatly improve the performance of the three-way catalyst, and that this alloying can be achieved by applying, especially a thermal treatment step, without regard to any particular theory. The present inventors have applied a very economical and efficient one-pot method to the manufacture of the preliminary catalyst, during which the thermal treatment step is applied.

MODE FOR INVENTION

The basic concept introduced into the present invention is that the Pd—Rh alloy obtained by thermally treating a preliminary catalyst greatly improves the performance of a three-way catalyst. Hereinafter, the present invention will be described in detail with reference to Examples, but it is clear that the idea of the present invention is not limited thereto.

EXAMPLES

Example 1

A support $Al_2O_3$ powder was impregnated sequentially or simultaneously with aqueous solutions of PdN (Pd-nitrate) and RhN (Rh-nitrate) so that a Pd—Rh weight ratio was 9:1. The alumina powder was dried in an oven at 150° C. for 5 hours and was calcined at 400 to 650° C. for 5 hours to thus manufacture a preliminary catalyst. A slurry was manufactured using the obtained preliminary catalyst. A substrate was coated with the slurry using a typical method, and was then thermally treated in a reducing gas atmosphere, for example, in an exhaust gas atmosphere, at 500 to 1100° C. for 1 to 50 hours, preferably 12 hours, thus manufacturing a catalyst main body.

Example 2

The preliminary catalyst of Example 1 was thermally treated in a reducing gas atmosphere, for example, in an exhaust gas atmosphere, at 500 to 1100° C. for 1 to 50 hours, and preferably 12 hours, thus manufacturing a thermally-treated support. Subsequently, a slurry was manufactured using the obtained thermally-treated alloy support. A substrate was coated with the slurry using a typical method, thus manufacturing a catalyst main body.

Examples 3 and 4

The same procedure as in Examples 1 and 2 was performed, except that a Pd—Rh weight ratio was changed to 1:49.

Example 5

The slurry-manufacturing and substrate-coating steps were same as in Example 2 except that Pd—Rh nano-alloy particles (diameter of 5 to 200 nm) having a Pd—Rh weight ratio of 9:1 were dry-mixed with a support $Al_2O_3$ powder.

Example 6

The same procedure as in Example 5 was performed except that the Pd—Rh weight ratio was changed to 1:49.

In addition to the above-described Examples, even when the same procedures as in the above-described Examples were repeated except that the Pd—Rh weight ratio was changed to 1:200 to 200:1, the performance of the three-way catalyst was improved, as in the specific Examples of 9:1 to 1:49. As the palladium precursor, Pd-AH (Pd-tetraamine hydroxide), Pd-tetraamine acetate, and Pd-diamine nitrate may be used, in addition to the above-described palladium precursor. Water was used as a solvent in the above-described Examples. However, needless to say, aqueous acid, for example, hydrochloric acid, nitric acid, and acetic acid, and an organic solvent, for example, acetone, methanol, and ethanol, may be used. Further, the present inventors did not use other additives in order to highlight the effect of palladium-rhodium alloying, but additives usually added to the catalyst, for example, a flow modifier or an acid modifier, may be used. The pH may be adjusted to 2 to 8, and preferably 3 to 6.

FIG. 1 shows a process of forming a Pd—Rh alloy crystal via a thermal treatment step (1100° C.) of a preliminary catalyst according to Example 1. FIG. 2 shows a crystal formation process during a thermal treatment step (700 to 1100° C.). The crystal was more clearly formed as the temperature of the thermal treatment was increased. FIG. 3 shows the alloy dispersion at 950° C. and 1100° C. according to the CO chemisorption experiment. The dispersion property was improved compared to the case where Pd was used alone. Further, according to TEM-EDAX, the average size of the Pd—Rh alloy particles of the present application was 102 nm, which is smaller than the average particle size of 137 nm in the case when Pd was used alone. FIG. 4 shows an effect of inhibiting the formation of $RhAlO_4$ due to the formation of a palladium-rhodium alloy. According to FIG. 4, the formation of $RhAlO_4$ was largely suppressed due to the alloying according to the present application, compared to the conventional case when Rh was used alone. In the case of the catalyst according to the present application, finally, a single layer of a catalyst main body was formed on a substrate, and the performance of the three-way catalyst was then measured. As summarized in FIG. 5, the lowering of THC, CO, and NOx was greatly improved in the present application.

The invention claimed is:

1. A method of manufacturing a supported catalyst including a crystalline Pd—Rh alloy, the method comprising:
   (i) generating an impregnated support by mixing an inorganic support, a Pd precursor solution, and an Rh precursor solution; and
   (ii) thermally treating the impregnated support from 700° C. to 1100° C. in an exhaust gas atmosphere for 12 hours, thereby manufacturing the supported catalyst including the crystalline Pd—Rh alloy having an average size of 102 nm in diameter.

2. A method of manufacturing a catalyst main body including a supported catalyst including a crystalline Pd—Rh alloy comprising:
   (i) generating an impregnated support by mixing an inorganic support, a Pd precursor solution, and an Rh precursor solution;
   (ii) manufacturing a slurry wash coat by mixing the impregnated support and an additive;
   (iii) coating a substrate with the slurry wash coat; and
   (iv) thermally treating the coated substrate from 700° C. to 1100° C. under a presence of an exhaust gas for 12 hours, thereby manufacturing the supported catalyst including the crystalline Pd—Rh alloy having an average size of 102 nm in diameter.

3. A method of manufacturing a catalyst main body including a supported catalyst including a crystalline Pd—Rh alloy, the method comprising:
   (i) generating an impregnated support by mixing an inorganic support, a Pd precursor solution, and an Rh precursor solution;
   (ii) thermally treating the impregnated support from 700° C. to 1100° C. in an exhaust gas atmosphere for 12 hours, thereby manufacturing the supported catalyst including the crystalline Pd—Rh alloy having an average size of 102 nm in diameter;
   (iii) manufacturing a slurry wash coat by mixing the thermally treated support and an additive; and
   (iv) coating a substrate with the slurry wash coat.

4. The method of claim 1, wherein a weight ratio of Pd and Rh on the inorganic support is 2001:1 to 1:200.

5. The method of claim 2, wherein the inorganic support is an alumina support or a ceria-zirconia mixed oxide.

* * * * *